(12) United States Patent
Yamaguchi et al.

(10) Patent No.: US 6,337,108 B1
(45) Date of Patent: Jan. 8, 2002

(54) POWDER PAINT COMPOSITION AND PROCESS FOR FORMING MULTI-LAYER COATS CONTAINING THE COAT THEREOF

(75) Inventors: Masayuki Yamaguchi; Yukihide Yamashita; Norihiko Sudo, all of Sayama; Shinji Seo, Hirakata; Kazuyoshi Uemura, Neyagawa, all of (JP)

(73) Assignees: Honda Giken Kogyo Kabushiki Kaisha, Tokyo-to; Nippon Paint Co., Ltd., Osaka-fu, both of (JP)

( * ) Notice: Subject to any disclaimer, the term of this patent is extended or adjusted under 35 U.S.C. 154(b) by 0 days.

(21) Appl. No.: 09/533,586

(22) Filed: Mar. 23, 2000

(30) Foreign Application Priority Data

Mar. 25, 1999 (JP) ............................................. 11-081347

(51) Int. Cl.⁷ ........................... B05D 1/04; C08L 63/00; B32B 9/04
(52) U.S. Cl. ........................ 427/470; 427/475; 427/486; 525/111; 525/124; 428/456; 428/483
(58) Field of Search ................................. 427/470, 415, 427/486; 525/111, 124; 428/456, 483

(56) References Cited

U.S. PATENT DOCUMENTS

| | | | |
|---|---|---|---|
| 4,390,662 A | | 6/1983 | Ando et al. |
| 4,716,200 A | | 12/1987 | Berghoff |
| 5,326,821 A | * | 7/1994 | Sasaki et al. |
| 5,741,552 A | * | 4/1998 | Takayama et al. |

OTHER PUBLICATIONS

Descriptions of coatings Raw Material Products, CRE-ANOVA Inc., Vestagon. Product information [online] Jan. 1998. Retrieved from internet: <URL: http://www.cre-anovainc.com/products/descript/dtcoatr.htm>.

ECN: Polyisocyanates today and tomorrow, Wenning, et al., Online article (Dec. 16, 1999) Retrieved from internet: <URL: http://www.coatings.de/articles/wenning/wenning.htm>.

WPI Abstract Accession No. 1999–186536 & JP 11035883 A Aishin (Feb. 9, 1999).

WPI Abstract Accession No. 1992–024327 & JP 4353554 A Dainippon (Dec. 8, 1992).

* cited by examiner

Primary Examiner—Fred J. Parker
(74) Attorney, Agent, or Firm—Wenderoth, Lind & Ponack, L.L.P.

(57) ABSTRACT

Disclosed is a powder paint composition that can form coating film having high corrosion resistance and excellent appearance even on a metal substrate surface containing non-flat portions and a process for forming multi-layer coats excellent both in corrosion resistance and top-coat adhesion using the powder paint composition. The powder paint composition comprises a) 30–55 parts by weight of a polyester resin having a hydroxyl value of 50–150, b) 1–20 parts by weight of a hydroxyl group-containing acrylic resin having a hydroxyl value of 30–150, c) 1–15 parts by weight of an epoxy resin, and d) 10–30 parts by weight of a urethodione ring-containing compound, based on 100 parts by weight of solid contents in the powder paint composition, the powder paint composition having an average particle size of 5–40 μm.

5 Claims, 2 Drawing Sheets

POWDER PAINT COMPOSITION AND PROCESS FOR FORMING MULTI-LAYER COATS CONTAINING THE COAT THEREOF

BACKGROUND OF THE INVENTION

1. Field of the Invention

The present invention relates to powder paint composition and a process for forming multi-layer coats containing the coat formed from the powder paint composition.

2. Description of the Prior Art

The powder paint that does not contain any organic solvent in the composition has been popularly adopted in the field having severe solvent restrictions, because the powder paint does not raise environmental pollution during coating. In addition, since the powder paint is easy to recycle and reuse during coating, and thick films can be formed in a lesser number of processes, the powder paint has been noted as a paint suited for world trends of non-pollution and resource conservation.

The powder paint is generally coated by electrostatic coating using a spray gun on a substrate which is grounded. Therefore, the powder paint can form uniform coated film on a flat portion of the substrate, but does not form uniform coated film on a non-flat surface portion of the substrate (particularly, dented parts of irregular profiles, etc.), because the particles of the powder paint do not satisfactorily adhere to the non-flat surface. Also, since the powder paint has a large paint particle size, it is difficult to reduce the irregularity of the coat surface even by melting and baking after coating.

In order to solve the above problem, a process for forming multi-layer coats has been proposed in Japanese Kokoku Publication Sho 56-10397 wherein powder coating is conducted on a substrate by a conventional method to form uniform coat on flat portions of the substrate and then electrodeposition paint is coated on the substrate to form a coated film an the non-flat portions or inner portions of the substrate in which uniform coated film is not generally formed. This process has been actually employed particularly for coating outer and inner plates of automobile car bodies.

However, the above mentioned process does not form a coated film having sufficient thickness on boundary portions between the powder-coated film and electrocoated film, and corrossion resistance is poor on the boundary portions, because electrocoated film does not sufficiently form on the portion where powder coated film is formed, as the electrodeposition is conducted after powder coating.

A large number of processes for improving the corrosion resistance at the boundary portions between the powder-coated film and the electrocoated film have also been proposed (Japanese Kokoku Publication Sho 60-111, Japanese Kokai Publications Hei 9-20663 and 9-20664).

In Japanese Kokoku Publication Sho 60-111, there is disclosed a process for enabling electrodeposition on powder-coated films by using electro-conductive powder paint In Japanese Kokai Publication Hei 9-20663 and 9-20664, there are disclosed processes for applying electro-conductive primer before or after the powder paint coating to secure the film thickness at the boundary portion between the powder-coated film and the electrocoated film.

However, in the former process, the electrodeposition occurs even on the thick film portion of the powder-coated film and the appearance of the powder-coated film is degraded (degraded smoothness) and economy is also degraded due to the use of unnecessary electrodeposition paint.

In the latter process, the high corrosion resistance required for the multi-layer coats is not obtained, because the coating process becomes complicated as the conductive primer coating process is added, the existence of the conductive primer coat impedes high corrosion resistance of electrocoated film, and the conductive primer does not exhibit satisfactory adhesion with the powder paint or the electrocoated film applied thereon.

SUMMARY OF THE INVENTION

It is an object of the present invention to provide a powder paint composition that can be applied to the conventional and known multi-layer coat forming process and that can achieve high corrosion resistance at the boundary between powder-coated film and the electrocoated film as well as excellent adhesion with a film formed thereon.

It is another object of the present invention to provide a process for forming multi-layer coats having high corrosion resistance and excellent appearance using the powder paint composition.

A powder paint composition comprising:
  a) 30–5 parts by weight of a polyester resin having a hydroxyl value of 50–150;
  b) 1–20 parts by weight of a hydroxyl group-containing acrylic resin having a hydroxyl value of 30–150;
  c) 1–15 parts by weight of an epoxy resin; and
  d) 10–30 parts by weight of a urethodione ring-containing compound, based on 100 parts by weight of solid contents in the powder paint composition, the powder paint composition having an average particle size of 5–40 μm.

The powder paint composition can exhibit the following effects by formulating plural types of resins having high hydroxyl values and a curing agent having a specific structure.

1. It is possible to provide powder-coated film that exhibits high corrosion resistance by forming a network structure in the coat by cross-linking reactions with a hydroxyl group-containing resin, such as polyester resin (a), etc. by a specific curing agent, while the epoxy resin (c) that can provide satisfactory corrosion resistance is contained in the powder paint composition.

2. It is possible to improve the adhesion with the top coat formed thereabove by the existence of the hydroxyl group-containing acrylic resin. In addition, if necessary, a petroleum resin (e) is formulated into the powder paint composition to improve the adhesion.

3. By reducing an average particle size of the powder paint composition, the smoothness and appearance of the powder-coated film can be improved.

The powder paint composition is characterized by the urethodione ring-containing compound (d) as a curing agent, of which a glass transition temperature is higher than that of the conventional blocked isocyanate curing agent (Tg= 40–55° C.), that is, not lower than 55° C. In this context, the present invention can provide a powder-coated film with excellent corrosion resistance.

Figure 1:
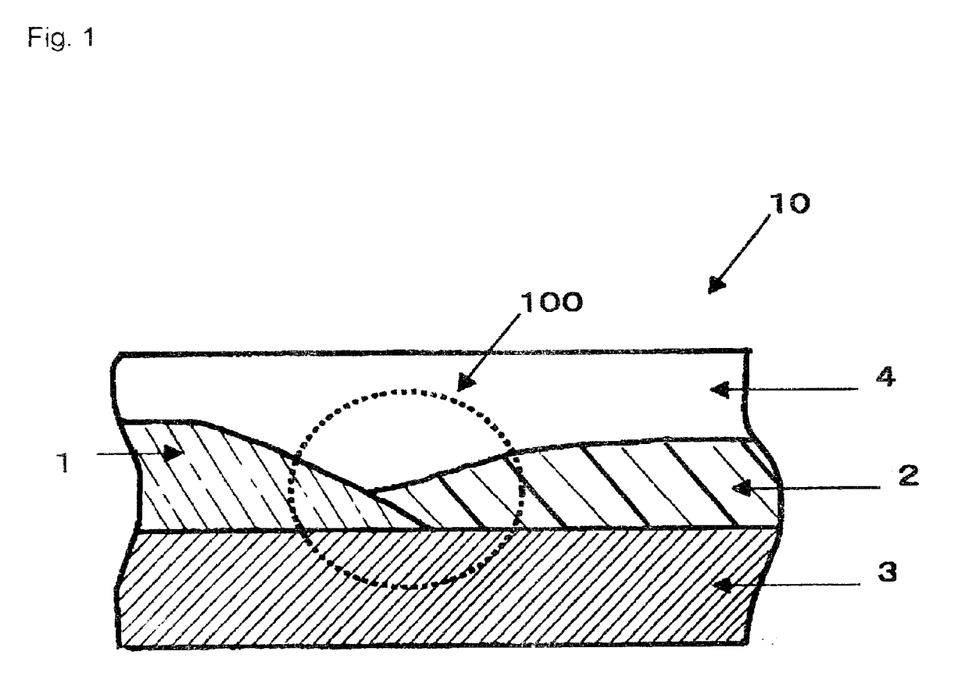
FIG. 1 is a cross-sectional view showing the multi-layer coats obtained by the process of the second embodiment according to the present invention.

The second embodiment of the present invention is a process for forming multi-layer coats 10 using the powder paint composition and electrodeposition paint as shown in FIG. 1, comprising
  (i) a process for forming a powder-mated film 1 by electrostatically coating the powder paint composition on a metal substrate 3,
  (ii) a process for heating the powder-coated film to the temperature at which the powder-coated film is not completely cured, (iii) a process for dipping the metal substrate with the powder-coated film in an electrodeposition paint bath to form an electrocoated film 2, (iv) a process for forming multi-layer coats by heating to cure both the powder-coated film and the electrocoated film, and (v) a process for forming a top coat 4 on the multi-layer coats obtained in the preceding process.

The present invention further provides the multi-layer coats 10 (see FIG. 1) formed by the above-mentioned process.

DETAILED DESCRIPTION OF THE PREFERRED EMBODIMENTS

Powder Paint Composition

The powder paint composition according to the present invention contains (a) the polyester resin, (b) the hydroxyl group-containing acrylic resin, and (c) the epoxy resin, which are film-forming components, as main components, and (d) the urethodione ring-containing compound as a curing agent. The powder paint composition may contain (e) a petroleum resin as an optional additive component.

The powder paint composition according to the present invention is characterized by that the polyester resin (a) and the acrylic resin (b) in the film-forming resins have a high hydoxyl value.

(a) Polyester Resin

Examples of polyester resin contained in the powder paint composition according to the present invention include polyhydric alcohol, such as ethylene glycol, propane diol, hexane diol, neopentyl glycol, trimethylolpropane, pentaerythritol, polymerized with carboxylic acids, such as maleic acid, terephthalic acid, isophthalic acid, phthalic acid, succinic acid, glutaric acid, adipic acid, sebacic acid, β-oxypropionic acid, by a conventional method, but it is preferable to use polyester resin having a hydroxyl value between 50 and 150, and more suitably between 70 and 120. In the present invention, if the hydroxyl value of polyester resin (a) is below 50, the corrosion resistance of the powder-coated film and at the boundary between powder-coated film and the electrocoated film is degraded. If the hydroxyl value of polyester resin (a) exceeds 150, not only the material cost increases because the amount of curing agent increases but also general performance (for example, impact resistance and solvent resistance) reduces.

The polyester resin (a) preferably has an acid number of not greater than 8, a softening point of from 95 to 105° C., and a number-average molecular weight of about 3,000, but shall not be limited thereto but may be varied as required in accord with the kind of other components contained.

An amount of polyester resin (a) in the powder paint composition according to the present invention may be 30–55 parts by weight based on 100 parts by weight of a total amount of the paint composition. If the amount of polyester resin (a) exceeds 55 parts by weight, the corrosion resistance of the powder-coated film and at the boundary between powder-coated film and the electrocoated film is degraded, or if it is below 30 parts by weight, the appearance of the powder-coated film and the adhesion to the top coat formed thereon are degraded, either of which is not desirable.

(b) Hydroxyl Group-containing Acrylic Resin

The acrylic resin used in the present invention may have a hydroxyl value of preferably between 30 and 150, and more suitably between 50 and 130, and for example, prepared from monomers chosen from styrene, acrylic acid or an alkylester or glycidyl ester, etc. of (metha)acrylic acid such as acrylic acid, methyl acrylate, ethyl acrylate, n-butyl acrylate, isobutyl acrylate, tert-butyl acrylate, glycidyl acrylate, glycydyl methacrylate, 2-methyl glycydyl methacrylate, etc. by way of a conventional method.

In the present invention, if the hydroxyl value of acrylic resin (b) is below 30, satisfactory adhesion with the opt coat formed on the powder-coated film of the present invention and on on the boundary between the powder-coated film and electrocoated film is not obtained. If the hydroxyl value of acrylic resin (b) exceeds 150, the material cost increases because it is not a general value in synthesis of acrylic resin by a conventional method, and in addition, the corrosion resistance of the film obtained is degraded, which is not desirable.

A number-average molecular weight of the acrylic resin (b) used in the present invention is preferably between 3000 and 4000, but is not particularly limited thereto.

An amount of acrylic resin (b) in the powder paint composition of the present invention may be between 1 and 20 parts by weight based on 100 parts by weight of the total amount of the paint composition, and preferably between 1 and 12 parts by weight. If the amount of acrylic resin (b) exceeds 20 parts by weight, the corrosion resistance of the powder-coated film as well as at the boundary between the powder-coated film and electrocoated film is degraded, or if it is below 1 part by weight, the adhesion with the top coat paint film formed on the powder-coated film and on the boundary between the powder-coated film and the electrocoated film is degraded, either of which is not desirable.

(c) Epoxy resin

For the epoxy resin, a compound having, two or more oxirane groups in the molecule is preferably used. Examples of the epoxy resins include glycidyl ester resin; glycidyl ether type resin of condensation reactants of bisphenol A and epichlorohydrin, condensation reactants of bisphenol F and epichlorohydrin, etc.; alicyclic epoxy resin; liner aliphatic epoxy resin; bromine containing epoxy resin; phenol-novolac type or cresol-novolac type epoxy resin, etc. For the epoxy resin (c) contained in the powder paint composition of the present invention, glycydyl ether type resin such as a condensation reactant between bisphenol A and epichlorohydrin, or a condensation reactant between bisphenol F and epichlorohydrin, etc. are particularly desirable.

The number-average molecular weight of the epoxy resin (c) may preferably be between 1200 and 4500.

The epoxy resin (c) as described above in the powder paint composition of the present invention can impart higher corrosion resistance to the powder-coated film as well as the boundary between the powder-coated film and the electrocoated film.

An amount of the epoxy resin (c) in the powder paint composition of the present invention can be between 1 parts by weight and 15 parts by weight based on 100 parts by weight of the total amount of the paint composition, and preferably between 3 parts by weight and 6 parts by weight. If the amount of epoxy resin (c) deviates from the range, the corrosion resistance of the powder-coated film and of the boundary between powder-coated film and electrocoated film reduces.

(d) Urethodione Ring-containing Compound

The urethodione ring-containing compound (d) that can be used in the powder paint composition of the present invention may be, for example, a compounds having urethodione ring structure obtained from aromatic, alicyclic, or aliphatic diisocyanate such as tolylene diisocyanate, xylylene diisocyanate, isophorone diisocyanate, hexamethylene diisocyanate, etc.

In the present invention, it is particularly preferable to use the urethodione ring-containing compounds of which a glass transition temperature (that is, Tg) is not lower than 55° C. The urethodione ring-containing compound in the powder paint composition as a curing agent can remarkably improve the resistance to warm salt water of the powder-coated film obtained as compared to the case in which conventional known blocking isocyanate whose Tg is about 40–55° C.

In the powder paint composition of the present invention, the urethodione ring-containing compound (d) can reduce a viscosity ($\eta$) of the powder paint at the time of baking, for example, to about 50–300 poise, which improves the appearance of the powder-coated film, although the compound (d) exhibits the crystallinity at temperature at the time of coating (generally, 0–50° C.).

The powder paint composition of the present invention may contain 10 to 30 parts by weight of the urethodione ring-containing compound (d) based on 100 parts by weight of the total amount of paint composition. If the amount of the urethodione ring-containing compound (d) is below 10 parts by weight, the corrosion resistance of the powder-coated film and the film appearance is degraded, or if it exceeds 30 parts by weight, the corrosion resistance of the powder-coated film and adhesion between the powder-coated film and the top coat formed thereon is degraded.

Or, in the powder paint composition of the present invention, an equivalent ratio of the hydroxyl group present in both the polyester resin (a) and the acrylic resin (b) to the isocyanate group present in the urethodione ring-containing compound (d) may be preferably 10:0.1 to 3:5 to 15. By satisfying the equivalent ratio, the hydroxyl group and isocyanate group react to cross-link during curing and a network structure is formed, and the corrosion resistance of powder-coated film is thereby able to be improved. If the equivalent ratio of the hydroxyl groups of the resins (a) and (b) to the isocyanate group in the component (d) is outside of the range, the corrosion resistance of the powder-coated film and boundary between the powder-coated film and electrocoated film, appearance of powder-coated film, and/or adhesion to the top coat film formed thereon are poor.

The presence of the hydroxyl group in the composition in accordance with the equivalent ratio may also improve the adhession with the top coat formed thereon, because the hydroxyl group works on the top coat film aftercuring.

(e) Petroleum Resin

The powder paint composition of the present invention may contain petroleum resin if necessary, in addition to the above-mentioned film forming components. The petroleum resin includes, for example, styrenechroman-indene copolymer. The petroleum resin (e) may generally have a number-average molecular weight of from 400 to 1000.

The addition of the petroleum resin (e) into the powder paint composition improves the adhesion with the top coat film.

The powder paint composition of the present invention may contain the petroleum resin (e) between 0.5 parts by weight and 10 parts by weight based on 100 parts by weight of the total amount of the paint composition, and preferably, between 0.5 parts by weight and 3.0 parts by weight, if necessary. If the amount of petroleum resin (e) is not more than 0.5 parts by weight, adhesion may reduce when overbaking the powder-coated film and electrocoated film, and if it exceeds 10 parts by eight, yellowing property lowers, either of which is not desirable.

The powder paint composition of the present invention may contain color pigments such as titanium oxide, red iron oxide, iron oxide, carbon black, phthalocyanine blue, phthalocyanine green, quinacridone-based pigment, azo pigment, etc.; fillers such as talc, silica, calcium carbonate, precipitated barium sulfate, etc.; chromium-based pigment, phosphate-based pigment; molybdenum based pigment, and other corrosion-resistant pigments; surface adjusting agents such as silicones such as dimethylsilicone or methylsilicone and acrylic oligomer, etc.; foam inhibitors represented by benzoins such as benzoin and benzoin derivatives with one to three kinds of functional group added to benzoin; anti-cratering agent; curing accelerator (or curing catalyst); plasticizer; antistatic agent; UV absorber; antioxidant; pigment dispersing agent; flame retarder; and powder fluidizing agent, and other various additives as required in addition to the above-mentioned film forming components.

Examples of the powder fluidizing agent include trade name "AEROSIL 130,®" "AEROSIL 200,®" "AEROSIL 300,®" "AEROSIL R-972,®" "AEROSIL R-812,®" "AEROSIL R-812S,®" "Titanium dioxide T-805," "Titanium dioxide P-25," and "Aluminum Oxide C" (all commercially available from Nihon Aerosil Company), and "Carplex FPS-1 (commercially available from Shionogi & Co.).

The total amount of the additives into the powder paint composition of the present invention can be up to 0.01–0.8 parts by weight based on 100 parts by weight of the total amount of powder paint composition.

The powder paint composition of the present invention can be manufactured by the process similar to the conventional powder paints. Specifically, the film forming components, curing agent, and other additives (however, excluding the powder fluidizing agent) are added at a specified ratio as shown above, melted, kneaded, and mixed. Thereafter, it is cooled and rough-ground, and fine-ground, and classified to separate very fine particles and coarse particles, thus obtaining the powder paint composition having a desired average particle size.

In the present invention, an average particle size of particles in the powder paint composition is preferably between 5 and 40 $\mu$m, and more suitably, 8 and 30 $\mu$m. Reducing the average particle size of the paint composition to the level smaller than the conventionally known powder paint average particle size (about 50 $\mu$m), can eliminate irregularity of the film surface, and as a result, the appearance of the coating film obtained is improved.

In the present invention, if the average particle size of the particle in the powder paint composition is not more than 5 $\mu$m, the manufacturing process increases complexity, and may lower the transfer efficiency of the powder paint for the metal substrate. Or, if the average particle size of particles in the powder paint composition exceeds 40 μm and if the metal substrate has any non-flat surface part, ease of powder paint composition to enter (also called penetration) the non-flat surface part lowers, and distribution of uniform film thickness is unable to be provided or appearance of the powder-coated film may be degraded.

Process for Forming Multi-layer Coats

The second embodiment of the present invention provides a process for forming multi-layer coats including the top coat thereon using the powder paint composition and electrodeposition paint.

As described above, the powder paint composition of the present invention can form a powder-coated film having high corrosion resistance and excellent appearance on the metal substrate with non-flat surface parts. In addition, the process of the second embodiment of the present invention forms a powder coated film on which an electrodeposition paint having high throwing power and high corrosion resistance is coated, to enhance corrosion resistance at the boundary between the powder-coated film and electrocoated film as well as an inner plate. According to the process of the present invention, no electrodeposition paint is applied to the powder-coated film having sufficient thickness and therefore the consuming amount of the electrodeposition paint recudes and leads to a cost reduction.

The process for forming multi-layer coats comprises:
(i) a process for electrostatically applying the powder paint composition to the metal substrate 3 to form a powder-coated film 1,
(ii) a process for heating the powder-coated film 1 to the temperature at which the powder-coated film is not completely cured,
(iii) a process for dipping the metal substrate 3 having the powder-coated film 1 in an electrodeposition paint bath to form an electrocoated film 2,
(iv) a process for forming multi-layer coats by heating the powder-coated film 1 and the electrocoated film 2 to cure, and
(v) a process for forming a top coat 4 on the multi-layer coat obtained in the preceding process.

The process of the present invention is characterized by the use of the powder paint composition of the first embodiment of the present invention and including a process (ii) for heating the coat to the temperature at which the powder-coated film is not completely cured.

The process of the present invention can impart enough corrosion resistance to the powder coated section equivalent to that of conventional electrodeposition paint. In addition, when the top coat is formed on the powder-coated film, adhesion with the top coat is more improved. Further, by using the above-mentioned powder paint composition, it is possible to provide the powder-coated film having excellent appearance.

In the process of the present invention, the powder-coated film on the metal substrate is heated to a temperature at which the film is not completely cured and therefore there are many fine clearances to exist between particles as the form of the powder paint particle is kept. The existence of the clearance enables the electrodeposition paint to penetrate into the powder-coated film and reach the metal substrate to form the electrocoated film. That is, even on the boundary between the powder-coated film and the electrocoated film, multi-layer coats having good corrosion resistance and good adhesion with the top coat film is formed, as same as the portions other than the boundary portions.

The process of the present invention is characterized by firstly forming a powder coated film and conducting electrodeposition coating to form an electrocoated film on portions, such as non-curved surfaces or inner plates of the substrate on which the powder-coated film is not formed (that is rear surfaces of the substrate), followed by heating both the powder-coated film and the electrocoated film to cure. In particular, according to the method of the present invention, it is possible to secure film thickness even on the boundary portions between the powder-coated film and the electrocoated film, and the resulting multi-layer coats have sufficient corrosion resistance.

The process of the present invention will be discussed in detail.

(i)–(ii) Formation of Powder-coated Film:

In the process of the present invention, the process (i) includes that the powder paint composition is electrostatically powder-coated on the metal substrate, as shown in FIG. 1.

For the metal substrate that can be used in the process of the present invention, any substrate can be used as long as the powder paint composition is applied by the electrostatic powder coating method and electrodedeposition coating method. Examples of the substrates are iron plate, aluminum plate, nickel plate, brass plate, magnesium plate, stainless steel plate, casting plate, phosphated steel plate, galvanized steel plate, cold rolled steel plate, zinc phosphate treated steel plate, iron phosphate treated steel plate, etc., but the present invention shall not be restricted to these The metal substrates may be used as they are or coated with a primer to form a primer coat It may be surface-treated by other processes. The treatments may be carried out solely or in combination.

The profile of the metal substrate that can be applied to the present invention is not particularly limited, but examples thereof are any three-dimensional structures with complicated profile, for example dented and protruded profiles, etc., for example, corrugated sheet form, box form, bag form, bar form, cylindrical form, columnar form, prismatic form, conical form, pyramid form, plate form with irregular patterns, plate form with slits, plate form with punching holes, mesh form, spherical form, semi-spherical form, propeller-like, louver-like, box-like with curvature, sheet-like form with curvature, punched block-form such as engine blocks, etc., sash rails such as windows, etc., hood-form, fuel tank of motorcycles, automobile body and wheel, etc.

For the electrostatic powder coating process carried out in the present process (i), either corona charging method (specifically, external charging method or internally charging method) or friction charging method may be used.

In general, the electrostatic powder coating process is achieved by spraying the powder paint composition over the substrate by the use of a powder coating gun (for example, corona charging type spray gun or tribo charging type spray gun) after grounding the metal substrate. The corona electrical-charging type spray gun may corona-discharge-treat the powder paint composition for spraying, while the friction-charging type spray gun to tribo-charge-treat it for spraying.

In the electrostatic powder coating process, the discharging amount of the powder paint composition of the present invention from the powder coating spray gun is preferably set to 50–400 g/min. A distance from a gun head of the powder coating spray gun to the metal substrate is preferably set to 100–500 mm from the viewpoint of paint transfer efficiency.

For example, when the powder paint composition is applied by the use of a corona charging type spray gun, the charging voltage applied to particles of powder paint composition by corona discharging treatment may be generally set between −30 kv and −150 kv, and preferably between −50 kv and −120 kv.

As explained above, the particles of the powder paint composition are electrostatically adhered to the metal substrate to be coated by the electrostatic powder coating process (i) to form a particle layer (that is, uncured powder-coated film). Then, the powder-coated film is heated for 1–15 minutes at temperature at which the film is not completely hardened (for example, 70–120° C.), melted, and fixed onto the metal substrate [process (ii)]. By the present process (ii), it is possible to prevent peeling of the powder-coated film when the substrate is dipped in an electrodeposition paint bath in the subsequent process.

(iii) Formation of electrocoated film:

In the process (iii), the metal substrate having the powder-coated film is dipped in the electrodeposition paint bath, and electric current is applied to the metal substrate to form an electrocoated film in the portion free of the powder-coated film (that is, the part where the metal substrate surface is exposed) and in a portion of a thin coat of the powder-coated film.

The present invention is characterized by forming the electrocoated film on the powder-coated film (or clearances in the film).

Because the powder-coated film generally functions as an electrically insulating film, it is general that no electrodeposition paint precipitates on the completely cured powder-coated film. However, according to the method of the present invention, since the powder-coated film is merely melted without being completely cured in the preceding process (ii), the profile of the powder paint particles is held to a certain extent, and fine clearances exist between particles. Consequently, when the electrodeposition paint enters the clearance and reaches the metal substrate, the electrodeposition paint may be deposited on the substrate. That is, in the powder-coated film portion with less film thickness, the entry of the electrodeposition paint takes place more easily, and as a result, as shown in FIG. 1, the electrodeposition paint is deposited even on the powder-coated film having a thinner film thickness, and the uniform film thickness is thereby able to be obtained on the boundaries between the powder-coated film and the electrocoated film.

The electrodeposition paint that can be used in the present process (iii) may be anionic or cationic electrodeposition paint that are popularly used in the relevant field, but from the viewpoint of high corrosion resistance, cationic electrodeposition paint is preferably used. The cationic electrodeposition paint is the cathodic deposition type thermosetting electrodeposition paint which is made water-soluble by neutralizing a binder resin having basic amino groups with acid. That is, the cationic electrodeposition paint can deposite on a metal substrate surface by setting the metal substrate to the cathode.

The binder resin having basic amino groups in the cationic electrodeposition paint may preferably be bisphenol type epoxy resins, of which epoxy groups are reacted with secondary amine (for example, a secondary amine obtained by blocking primary amine with diethylenetriamine, etc. to form ketimine groups).

The crosslinking agent contained in the cationic electrodeposition paint can be a blocked polyisocyanate prepared by reacting a polyisocyanate with a blocking agent such as alcohols, phenols, oximes, lactams, etc.

The cationic electrodeposition paint may further contain pigments such as colorant pigments, fillers, corrosion resistant pigments, etc., hydrophilic and/or hydrophobic solvents, and additives, etc. as required. The pigments may be used in an amount of 5–150 parts by weight based on 100 parts by weight of the resin solids in the paint.

The electrodeposition paint is preferably formed in a film thickness of 10–40 $\mu$m after baking, and particularly the 15–25 $\mu$m film thickness.

In the present invention, the electrodeposition paint preferably has a thermosetting temperature nearly equivalent to a thermosetting temperature of the powder paint composition according to the process (iv). Accordingly, the electrodeposition paint preferably has a thermosetting temperature of from 150 to 240° C.

(iv) Heat Curing Process:

In the process; the multi-layer coats are obtained by heat-curing both the powder-coated film and the electrocoated film formed by the preceding process.

The powder-coated film is simply melted without completely curing, in the preceding process (ii), but in this process, it is completely cured. By curing the electrocoating film simultaneously, the multi-layer coats can be obtained.

The multi-layer coats formed by the multi-layer coat forming method provide better surface smoothness of the powder-coated film itself (consequently, provide better appearance), because powder paint composition with smaller mean particle size is used, as compared to the multi-layer coats formed by the conventional known method (for example, Japanese Patent Publication No. Sho 56-10397) using the commonly used powder paint.

(v) Formation of Top Coat Film:

In the present invention, a top coat film is then formed on the multi-layer coats obtained in the above-mentioned method. In the multi-layer coats of the present invention, since the powder-coated film contains acrylic resin containing hydroxyl group, superb adhesion with the top coat film formed thereon is able to be exhibited. It is also possible to further improve the adhesion with the top coat film by allowing the above-mentioned petroleum resin (e) to be contained in the powder coating, as required.

For the top coat film that can be formed on the multi-layer coats (that is, in the case of colored paint only or combination of colored paint and clear paint) and the film-forming method, any of known methods in the this field can be used.

The colored paint basically contains the binder resin, curing agent, and pigment. The clear paint contains a binder resin and a curing agent, and a little or zero pigments. For the pigments, colorant pigments, filler pigments, gloss pigments, etc. are available, and the colored paint containing the gloss pigment is particularly called metallic paint. In general, the metallic paint is combined with the clear paint and used to form the gloss multi-layer coats.

For a specific application example of the top-coat paint, after applying at least one kind of colored paint on the multi-layer coats formed with the powder-coated film and the electrocoated film obtained as above, a clear paint is applied as required. Each of the top coat paint film may be cured separately or the colored paint film and the adjacent clear paint film may be simultaneously cured.

EXAMPLES

Referring now to examples, the present invention will be described, but it must not be construed that the present invention is limited to the following examples and comparative examples. In the following examples and comparative examples, % and parts should all mean % by weight and parts by weight unless otherwise indicated.

Preparation Example 1

| Composition | Compounding amount |
|---|---|
| Polyester resin (FINEDICK M-8024, available from Dainippon Ink & Chemicals, Inc.; hydroxyl value: 110) | 43.5 parts by weight |
| Acrylic resin (FINEDICK A-251, available from Dainippon Ink & Chemicals, Inc.; hydroxyl value: 105) | 10.0 parts by weight |
| Epoxy resin (EPICOAT 1004 epichlorohydrin-bisphenol An epoxy resin, available from Yuka Shell Epoxy Co., Ltd.) | 5.0 parts by weight |
| Urethodione-based curing agent (VESTAGON BF-1540, available from Hüls Japan Ltd.) | 24.0 parts by weight |
| Styrene-chroman-indene copolymer (EXRON G-90, available from Shin Nittetsu Kagaku Co., Ltd.) | 1.0 part by weight |
| Surface adjusting agent (ALMATEX LZ-100, available from Mitsui Toatsu Chemicals, Inc.) | 1.0 part by weight |
| Anti-cratering agent (BENZOIN B, available from Wako Pure Chemical Industries, Ltd.) | 0.4 parts by weight |
| Titanium oxide (TIEPERK CR-95, available from Ishihara Snagyou Co., Ltd.) | 10.0 parts by weight |
| Carbon black (MITSUBISHI CARBON MA-100, available from Mitsubishi Kasei Corp.) | 0.1 part by weight |
| Precipitated barium sulfate (PRECIPITATED BARIUM SULFATE 300, available from Sakai Kagaku Kogyo Co., Ltd.) | 5.0 parts by weight |
| Fludizing agent (CARPLEX FPS-1, available from Shionogi & Co., Ltd.) | 0.2 parts by weight |

The above ingredients except the fluidizing agent were mixed for about 3 minutes, using "SUPER MIXER" (available from Nippon Spindle Co., Ltd.), and further using Buss's "CO-KNEADER," to melt and knead at about 100° C. Then, the obtained mixture was cooled to room temperature, roughcrushed, and fine crushed by JET MILL Model IDS-2 available from Nihon Pneumatic Kogyo Co., Ltd. The powder obtained was classified by an air classifier Model DS-2 available from Nihon Pneumatic Kogyo to separate fine particles and coarse particles, thus obtaining a powder paint composition. To 100 parts by weight of the powder paint composition, 0.2 parts by weight of the fluidizing agent (KARPLEX FPS-1 available from Shionogi) was added and mixed for one minute with the SUPER MIXER, and the powder paint composition of the present invention was obtained.

An average particle size and particle size distribution of the powder paint composition obtained were measured by a particle size analyzer (MICROTRACK HRA X-100, available from Nikkiso Co., Ltd.). In carrying out the measurement, an analysis program MICROTRACK D. H. S. X-100 Data Handling System SD-9300PRO-100 available from Nikkiso was used, and for measurement conditions, "Particle Transparency" was set to "reflect." For measurement samples, 50 g of a 0.1% surfactant aqueous solution and 0.5 g of the powder paint to be measured were added in a sample bottle, and a sample bottle was immersed for 3 minutes in water ultrasonic-vibrated by the ultrasonic washer (SILENT SONIC UT-105 available from Sharp Corp.) and the powder paint disperse water was prepared. The same average particle size and particle distribution measurement method was used for each of the following preparation examples and comparative preparation examples.

The average particle size of the powder paint composition measured by the method was 35 $\mu$m.

Preparation Examples 2–10 and Comparative Preparation Examples 1–7

Each of powder paint composition was prepared in the same manner as described in Preparation Example 1, except that the ingredients and amounts shown in Table 1 and Table 2 were used. Table 1 and Table 2 also show average size of particles of powder paint compositions obtained.

TABLE 1

(parts by weight)

| | Preparation examples | | | | | | | | | |
|---|---|---|---|---|---|---|---|---|---|---|
| Composition | 1 | 2 | 3 | 4 | 5 | 6 | 7 | 8 | 9 | 10 |
| Polyester resin[1] | 43.5 | 43.5 | 48.2[12] | 36.0 | 50.0 | 48.3 | 43.5 | 44.2 | 41.0 | 43.5 |
| Acrylic resin[2] | 10.0 | 10.0 | 10.0 | 8.0 | 10.0 | 2.5 | 10.0 | 10.0 | 5.0 | 10.0 |
| Epoxy resin[3] | 5.0 | 5.0 | 5.0 | 4.0 | 5.0 | 5.0 | 5.0[13] | 5.0 | 5.0 | 5.0 |
| Hardener[4] | 24.0 | 24.0 | 19.3 | 20.0 | 27.5 | 26.7 | 24.0 | 24.3 | 22.5 | 24.0 |
| Petroleum resin[5] | 1.0 | 1.0 | 1.0 | 0.8 | 1.0 | 1.0 | 1.0 | 0.0 | 10.0 | 1.0 |
| Surface adjusting agent[6] | 1.0 | 1.0 | 1.0 | 0.8 | 1.0 | 1.0 | 1.0 | 1.0 | 1.0 | 1.0 |
| Anti-cratering agent[7] | 0.4 | 0.4 | 0.4 | 0.4 | 0.5 | 0.4 | 0.4 | 0.4 | 0.4 | 0.4 |
| Titanium oxide[8] | 10.0 | 10.0 | 10.0 | 25.0 | 3.0 | 10.0 | 10.0 | 10.0 | 10.0 | 10.0 |
| Carbon black[9] | 0.1 | 0.1 | 0.1 | 0.0 | 2.0 | 0.1 | 0.1 | 0.1 | 0.1 | 0.1 |
| Precipitated barium sulfate[10] | 5.0 | 5.0 | 5.0 | 5.0 | 0.0 | 5.0 | 5.0 | 5.0 | 5.0 | 5.0 |
| Sub-total (parts by weight) | 100.0 | 100.0 | 100.0 | 100.0 | 100.0 | 100.0 | 100.0 | 100.0 | 100.0 | 100.0 |
| Fluidizing agent | 0.2 | 0.2 | 0.2 | 0.2 | 0.2 | 0.2 | 0.2 | 0.2 | 0.2 | 0.2 |
| Average particle size ($\mu$m) | 35 | 20 | 25 | 20 | 20 | 25 | 20 | 20 | 20 | |

TABLE 2

(parts by weight)

|  | Comparative preparation examples | | | | | | |
|---|---|---|---|---|---|---|---|
| Composition | 1 | 2 | 3 | 4 | 5 | 6 | 7 |
| Polyester resin[1] | 58.0[14] | 58.0[14] | 42.2 | 50.0 | 43.5 | 46.7 | 43.5 |
| Acrylic resin[2] | 10.0 | 10.0 | 10.0 | 0.0 | 10.0[16] | 10.0 | 10.0 |
| Epoxy resin[3] | 5.0 | 5.0 | 5.0 | 5.0 | 5.0 | 0.0 | 5.0 |
| Hardener[4] | 10.5 | 10.5[15] | 25.31[15] | 27.5 | 24.0 | 25.8 | 24.0 |
| Petroleum resin[5] | 1.0 | 1.0 | 1.0 | 1.0 | 1.0 | 1.0 | 1.0 |
| Surface adjusting agent[6] | 1.0 | 1.0 | 1.0 | 1.0 | 1.0 | 1.0 | 1.0 |
| Anti-cratering agent[7] | 0.5 | 0.4 | 0.4 | 0.4 | 0.4 | 0.4 | 0.4 |
| Titanium oxide[8] | 3.0 | 10.0 | 10.0 | 10.0 | 10.0 | 10.0 | 10.0 |
| Carbon black[9] | 2.0 | 0.1 | 0.1 | 0.1 | 0.1 | 0.1 | 0.1 |
| Precipitated barium sulfate[10] | 9.0 | 4.0 | 5.0 | 5.0 | 5.0 | 5.0 | 5.0 |
| Sub-total (parts by weight) | 100.0 | 100.0 | 100.0 | 100.0 | 100.0 | 100.0 | 100.0 |
| Fluidizing agent | 0.2 | 0.2 | 0.2 | 0.2 | 0.2 | 0.2 | 0.2 |
| Average particle size ($\mu$m) | 25 | 25 | 25 | 25 | 25 | 25 | 50 |

Details of each ingredient in the above table are shown as follows:
1) Polyester resin (FINEDICK M-8024, available from Dainippon Ink & Chemicals, Inc.; hydroxyl value: 110)
2) Acrylic resin (FINEDICK A-251, available from Dainippon Ink & Chemicals, Inc.; hydroxyl value: 105)
3) Epoxy resin (EPICOAT 1004 epichlorohydrin-bisphenol A based epoxy resin, available from Yuka Shell Epoxy Co., Ltd.; epoxy value: about 900)
4) Urethodione-based hardener (VESTAGON BF-1540, available from Hüls Japan Ltd.)
5) Petroleum resin Styrenechroman-indene copolymer (EXRON G-90, available from Shin Nittetsu Kagaku Co., Ltd.)
6) Surface adjusting agent (ALMATEX LZ-100, available from Mitsui Toatsu Chemicals, Inc.)
7) Anti-cratering agent (BENZOIN B, available from Wako Pure Chemical Industries, Ltd.)
8) Titanium oxide (TIEPERK CR-95, available from Ishihara Snagyou Co., Ltd.)
9) Carbon black (MITSUBISHI CARBON MA-100, available from Mitsuibishi Kasei Corp.)
10) Precipitated barium sulfate (PRECIPITATED BARIUM SULFATE 300, available from Sakai Kagaku Kogyo Co., Ltd)
11) Fluidizing agent (CARPLEX FPS-1, available from Shionogi & Co., Ltd.)
12) Polyester resin (FINEDICK ZP-751, available from Dainippon Ink & Chemicals, Inc.; hydropxyl value: 80)
13) Epoxy resin (EPICOAT 1007 epichlorohydrin-bisphenol A based epoxy resin, available from Yuka Shell Epoxy Co., Ltd.; epoxy value: about 2000)
14) Polyester resin (FINEDICK M-8020, available from Dainippon Ink & Chemicals, Inc.; hydroxyl value: 30)
15) Blocking isocyanate-based hardener (VESTAGON B-1530 ε-caprolactam-isophoronediisocyanate, available from Hüls Japan Ltd.)
16) Acrylic resin (FINEDICK A-241 glycidyl group containing acrylic resin, available from Dainippon Ink & Chemicals, Inc.; epoxy value: 600)

Example 1

Figure 2:
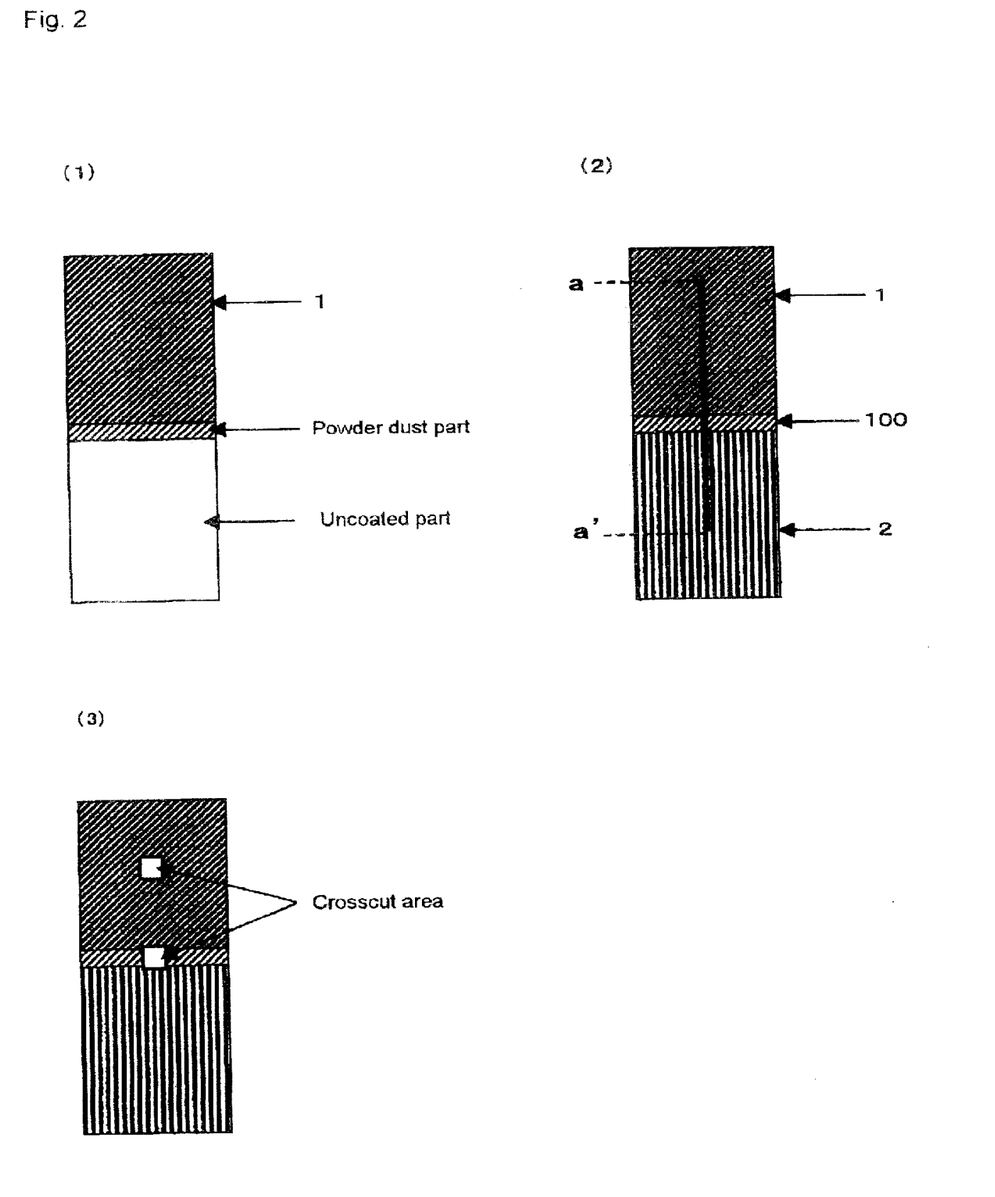
FIG. 2 is a plan view schematically indicating a process for forming steel sheet samples obtained in Examples 1–10 and Comparative Examples 1–8 and the coat evaluation method.

First of all, for metal substrates, zinc-phosphated steel plates measuring 10 cm by 30 cm and 0.8 mm thick were prepared. The steel plate was arranged on a horizontally traveling type overhead conveyor. Then, while the horizontally traveling type overhead conveyor was allowed to travel at a constant speed, the powder paint composition prepared in Preparation Example 1 was applied using a corona electrical charging type spray gun (PG-1 available from GEMA) to an area one half that of the steel plate surface as shown in FIG. 2 (1) by a corona electric charging type powder coating method. Setting was made to achieve the 50 $\mu$m film thickness of powder-coated film formed.

The electrostatic powder coating conditions were shown as follows:

Horizontally traveling type overhead conveyor travel speed: 1.8 m/min

Applied voltage: −80 kv

Discharging amount: 100 g/min

Spray pressure: 1.0 kgf/cm$^2$

Air flow rate: 4.5 m$^3$/h

After electrostatic powder coating, the steel plate was heated under a condition in which the powder-coated film was not completely hardened (that is at 85° C. for 5 minutes).

Then, to the region free of powder-coated film and the powder dust part on the steel plate surface, a block isocyanate curing type cation electrodeposition paint "UPOWER TOP V-50" available from Nippon Paint Co., Ltd. was electrocoated. The steel plate was dipped in a bath of the electrodeposition paint at 28° C., and electrocoating was carried out at 230 V coating voltage for 3 minutes. Conditions were set to achieve 20 $\mu$m electrocoated film thickness on the steel plate free from the powder paint.

Then, the steel plate was taken out from the electrodeposition bath and washed with water. The electrocoated film was formed only in the region free of powder-coated film and powder dust part.

After electrocoating, both the powder-coated film and the electrocoated film were cured by heating the steel plates in a hot air drying furnace under two hardening conditions: for 20 minutes at 180° C. and for 20 minutes at 220° C. to prepare two kinds of coated steel plates (sample a).

Thereafter, for coated steel plates for evaluating top coat adhesion, polyesterlmelamine resin-based 1-coat 1-bake type white paint "ORGA S61H NH-578" available from Nippon Paint was further applied to the powder-coated film part and boundaries between the powder-coated film and electrocoated film on the steel plates in such a manner to form a 40 μm dried film thickness, and heated for 20 minutes at 140° C. to thermally cure the top-coat film. The steel plates samples that had undergone up to this process are called the "sample b" to distinguish from the previously mentioned sample a.

Examples 2–10 and Comparative Examples 1–7

Steel plate samples a and b were formed, respectively, in the same procedures as in the case of Example 1, except that the powder paint obtained in Preparation Examples 2–10 and Comparative Preparation Examples 1–7 were used.

Comparative Example 8

Steel plate samples a and b were formed, respectively, in the same procedures as Example 1 except that the powder paint obtained in Preparation Example 2 was used and the heating conditions after powder coating were for 5 minutes at 135° C.

Evaluation of Coating

The coating film of each powder paint composition formed in Examples 1–10 and Comparative Examples 1–8 were evaluated by the following procedure.

1. Appearance Evaluation of Powder-coated Film

In the steel plate sample "a" baked for 20 minutes at 180° C., the appearance of powder-coated film was evaluated. For the evaluation means, a surface roughness profile measuring apparatus (SURFCOM 470A available from Tokyo Seimitsu Co., Ltd.) was used, and with the cut-off value set to 0.8 mm an scanning to 0.3 mm/sec, and the Ra value was measured. Presence of any failure of coating film was also checked. The evaluation results are shown in Table 3.

The Ra value not more than 0.6 is evaluated as satisfactory coating film appearance.

2. Warm Salt Water Corrosion Resistance Test

The steel sample "a" baked for 20 minutes at 180° C. after electrocoating was used for evaluation. After the film was cut linearly from the powder-coated film part to the electrocoated film part of the steel sheet sample (that is, the a—a' section of FIG. 2 (2)), the whole steel plate was immersed in the 5% brine for 240 hours at 55° C., a tape was pressed down over the cut area and jerked away. The warm salt water corrosion resistance of the steel plate was evaluated pursuant to the following criteria in accord with the peeled widths on both sides of the cut part at the portion with the greatest peeled width.

Evaluation Criteria

◎:<0 mm
○: 0–1 mm
Δ: 1–5 mm
×:>5 mm Table 3 shows the results.

3. Top Coat Adhesion Test

Using steel plate sample "b" baked under two kinds of conditions: for 20 minutes at 180° C. and for 20 minutes at 220° C. after electrocoating, and further formed with a top coat as described above, evaluation was carried out on the adhesion of the powder-coated film part to the topcoat and adhesion of the top coat at boundaries between powder-coated film and the electrocoated film by the following procedures.

The film was scratched with a utility knife so that checkers comprising 100 pieces of grids 2 mm square were obtained at two places shown in FIG. 2 (3) (powder-coated film part and boundaries between powder-coated film and electrocoated film on the steel plate sample surface). After a cellophane tape was pressed down over the crosscut area and rapidly jerked away at an angle of 90° C. with respect to the film surface, and the number of the squares remaining on the film were counted (n). Table 3 shows the results. However, the adhesion is expressed by n/100.

TABLE 3

| | Examples | | | | | | | | | |
|---|---|---|---|---|---|---|---|---|---|---|
| | 1 | 2 | 3 | 4 | 5 | 6 | 7 | 8 | 9 | 10 |
| Powder paint composition | Preparation example 1 | Preparation example 2 | Preparation example 3 | Preparation example 4 | Preparation example 5 | Preparation example 8 | Preparation example 7 | Preparation example 8 | Preparation example 9 | Preparation example 10 |
| Evaluation item | | | | | | | | | | |
| Appearance of powder-coated film Ra | 0.35 | 0.14 | 021 | 0.28 | 0.09 | 0.22 | 0.15 | 0.15 | 0.13 | 0.08 |
| Failure of coating film Warm salt water corrosion resistance test | None | None | None | None | None | None | None | None | None | None |
| Powder-coated film | ◎ | ◎ | ◎ | ◎ | ◎ | ◎ | ◎ | ◎ | ◎ | ◎ |
| Boundaries Top coat adhesion Powder-coated film | ◎ | ◎ | ◎ | ◎ | ◎ | ◎ | ◎ | ◎ | ◎ | ◎ |
| 180° C. × 20 min. | 100/100 | 100/100 | 100/100 | 100/100 | 100/100 | 100/100 | 100/100 | 100/100 | 100/100 | 100/100 |
| 220° C. × 20 min. | 100/100 | 100/100 | 100/100 | 100/100 | 100/100 | 100/100 | 100/100 | 100/100 | 100/100 | 100/100 |

TABLE 3-continued

| Powder paint composition | Examples | | | | | | | | | |
|---|---|---|---|---|---|---|---|---|---|---|
| | 1 Preparation example 1 | 2 Preparation example 2 | 3 Preparation example 3 | 4 Preparation example 4 | 5 Preparation example 5 | 6 Preparation example 8 | 7 Preparation example 7 | 8 Preparation example 8 | 9 Preparation example 9 | 10 Preparation example 10 |
| Boundaries | | | | | | | | | | |
| 180° C. × 20 min. | 100/100 | 100/100 | 100/100 | 100/100 | 100/100 | 100/100 | 100/100 | 100/100 | 100/100 | 100/100 |
| 220° C. × 20 min. | 100/100 | 100/100 | 100/100 | 100/100 | 100/100 | 100/100 | 100/100 | 100/100 + | 100/100 | 100/100 |

+: Dot form peels are found.

TABLE 4

| Powder paint composition | Comparative Example | | | | | | | |
|---|---|---|---|---|---|---|---|---|
| | 1 Comparative Preparation Example 1 | 2 Comparative Preparation Example 2 | 3 Comparative Preparation Example 3 | 4 Comparative Preparation Example 4 | 5 Comparative Preparation Example 5 | 6 Comparative Preparation Example 6 | 7 Camparative Preparation Example 7 | 8 Preparation Example 8 |
| Evaluation Items | | | | | | | | |
| Appearance of powder-coatedfilm Ra | 0.63 | 0.55 | 0.18 | 0.24 | 0.20 | 0.22 | 1.02 | 0.13 |
| Failure of coating film Warm salt water corrosion resistance test | None | None | loss of gloss | None | None | None | None | None |
| Powder-coated film | Δ | x | x | ◎ | ◎ | x | ◎ | ◎ |
| Boundaries Top coat adhesion Powder-coated film | x | x | x | ◎ | ◎ | x | ◎ | x |
| 180° C. × 20 min. | 100/100 | 100/100 | 100/100 | 100/100 | 100/100 | 100/100 | 100/100 | 100/100 |
| 220° C. × 20 min. | 100/100 | 100/100 | 100/100 | 0/100 | 0/100 | 100/100 | 100/100 | 100/100 |
| Boundaries | | | | | | | | |
| 180° C. × 20 min. | 100/100 | 100/100 | 100/100 | 100/100 | 100/100 | 100/100 | 100/100 | 100/100 |
| 220° C. × 20 min. | 100/100 | 100/100 | 100/100 | 0/100 | 0/100 | 100/100 | 100/100 | 100/100 |

Effect of the Invention

The powder paint composition according to the present invention is able to exhibit the following effects by containing a plurality of resins with high hydroxyl values and a hardener with a specific structure.

1. It is possible to provide powder-coated film that exhibits high corrosion resistance by forming a network structure in the coat by cross-linking reactions with hydroxyl group containing resin such as polyester resin.(a), etc. through using a specific hardener while epoxy resin (c) that can provide satisfactory corrosion resistance is compounded in the powder paint composition.

2. It is possible to improve the adhesion with the top coat formed further above by the existence of hydroxyl group containing acrylic resin. In addition, depending on circumstances, by containing e) petroleum resin in the powder paint composition, the adhesion is able to be further improved.

3. By reducing the mean particle size of the powder paint composition, smoothness and appearance of the powder-coated film are able to be improved.

According to the process of the present invention, the use of the powder paint composition and melting the powder-formed film without completely hardening can securely affix the coating film to the metal substrate and can provide corrosion resistance equivalent to that of electrocoated film at boundaries between the powder-coated film and the electrocoated film. And it is also possible to form multi-layerd coats with excellent adhesion with the top-coat film formed on these multi-layer coats.

What is claimed is:

1. A powder paint composition comprising:

a) 30–55 parts by weight of a polyester resin having a hydroxyl value of 50–150;

b) 1–20 parts by weight of a hydroxyl group-containing acrylic resin having a hydroxyl value of 30–150;

c) 1–15 parts by weight of an epoxy resin; and d) 10–30 parts by weight of a urethodione ring-containing compound, based on 100 parts by weight of solid contents in the powder paint composition, the powder paint composition having an average particle size of 5–40 μm.

2. A process for forming multi-layer coats comprising (i) forming a powder coating by electrostatically coating the powder paint composition according to claim 1 on a metal substrate, (ii) heating the powder coating to a temperature at which the powder coating film is not completely cured, (iii) dipping the metal substrate containing the not completely cured powder coating in an electrodeposition paint bath to form an electrocoated film thereon, (iv) forming multi-layer coats by simultaneously heating to cure the not completely cured powder coating and the electrocoated film, and (v) forming a top coat on the multi-layer coats.

3. The multi-layer coats formed by the process according to claim 2.

4. A method of forming multi-layer coats, comprising providing the powder paint composition according to claim 1, which is applied on a metal substrate and not completely cured, to form a layer, and then dipping said substrate with said layer thereon in an electrocoating bath to electrocoat and form another layer thereon, followed by curing both the layers on said substrate and forming thereon a top coating.

5. The powder paint composition according to claim 1, which further comprises (e) a petroleum resin.

* * * * *